United States Patent [19]

Yerkey

[11] 4,014,589

[45] Mar. 29, 1977

[54] PORTABLE WINDSHIELD FOR A RIDING TYPE GOLF CART

[76] Inventor: Elton C. Yerkey, P.O. Box 2545, Tuscaloosa, Ala. 35401

[22] Filed: Oct. 2, 1975

[21] Appl. No.: 618,743

[52] U.S. Cl. .................... 296/78 R; 280/DIG. 5; 296/143
[51] Int. Cl.² ................................. D62J 17/00
[58] Field of Search ............ 296/78 R, 78 A, 78.1, 296/79, 82, 83, 140, 141, 143; 280/727, DIG. 5

[56] References Cited

UNITED STATES PATENTS

| 973,585 | 10/1910 | Thompson | 296/79 |
| 3,829,152 | 8/1974 | Hobbs | 296/78.1 |
| 3,958,826 | 5/1976 | Upton | 296/78 R |

FOREIGN PATENTS OR APPLICATIONS

| 32,259 | 8/1923 | Denmark | 280/727 |
| 1,025,290 | 2/1958 | Germany | 296/78.1 |
| 471,175 | 5/1952 | Italy | 296/78.1 |

*Primary Examiner*—Joseph F. Peters, Jr.
*Assistant Examiner*—John A. Carroll
*Attorney, Agent, or Firm*—Woodford R. Thompson, Jr.

[57] ABSTRACT

A portable windshield for a riding type golf cart embodying a transparent, flexible sheet extending across the forward end of the cart with the lower edge of the sheet being under a lower front portion of the cart and the upper edge of the sheet being over the front portion of the roof of the cart. Rigid rod-like members are carried by the lower and upper edges of the sheet and extend transversely of the cart under the lower front portion thereof and over the front portion of the roof thereof, respectively. Flexible members carried by the ends of the rod-like members are attachable to the cart.

4 Claims, 6 Drawing Figures

PORTABLE WINDSHIELD FOR A RIDING TYPE GOLF CART

BACKGROUND OF THE INVENTION

This invention relates to a portable windshield for a riding type golf cart and more particularly to such a windshield which may be readily attached securely to any type of golf cart having a roof thereover without the necessity of employing bolts, screws, clamps and the like, thus adapting the windshield for use on a golfer's own cart and on rental carts.

Heretofore in the art to which my invention relates, difficulties have been encountered in providing windshields for golf carts due to the fact that it has been necessary to mount the windshield permanently on the golf cart in order to provide good visibility due to the fact that the entire sheet of transparent material forming the windshield must extend in a common plane while in use as a windshield. The use of transparent, flexible sheets of plastic material as a windshield has heretofore been unsatisfactory due to the fact that the material becomes wrinkled whereby it distorts a person's vision. Also, it is very difficult to attach sheets of material to a golf cart and remove the same therefrom and then provide storage for such sheets when not in use.

SUMMARY OF THE INVENTION

In accordance with my invention, I provide a portable windshield which permits play in weather otherwise unfit for play and at the same time protects the golfer from rain, wind, flying golf balls, and prevents insects and dust from entering the eyes of the golfer. My improved windshield comprises a transparent, flexible sheet which remains in an unwrinkled condition while in use as a windshield and while being stored. The sheet extends across the forward end of the cart with the lower edge of the sheet being secured to a transverse, rod-like member which extends under a lower front portion of the cart. The upper edge of the sheet is secured to a transverse rod-like member which extends over the front portion of the roof of the cart. Flexible members carried by the ends of the rod-like members are attachable to suitable structural parts of the cart. The windshield is thus light-weight whereby it is easily handled and installed by one person. When not in use, the windshield is rolled up into a small package which may be kept in a golf bag whereby the windshield goes with the golfer wherever he takes his clubs.

A portable windshield embodying features of my invention is illustrated in the accompanying drawings, forming a part of this application, in which.

Figure 5:
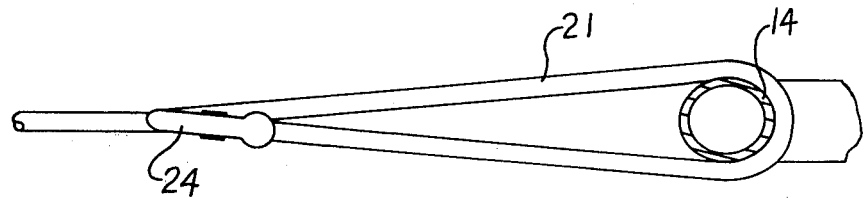
Figure 6:
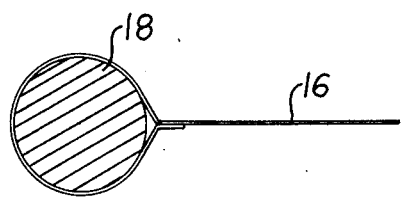

FIG. 5 is an enlarged, fragmental view, partly broken away and in section, showing the free end of the flexible member carrying a grip element and passing around a structural part of the golf cart and then attached to the same flexible member to thus secure the adjacent portion of the windshield assembly to the golf cart; and, FIG. 6 is a transverse, sectional view through one of the rod-like members showing the manner in which the transparent, flexible sheet is attached thereto.

Figure 1:
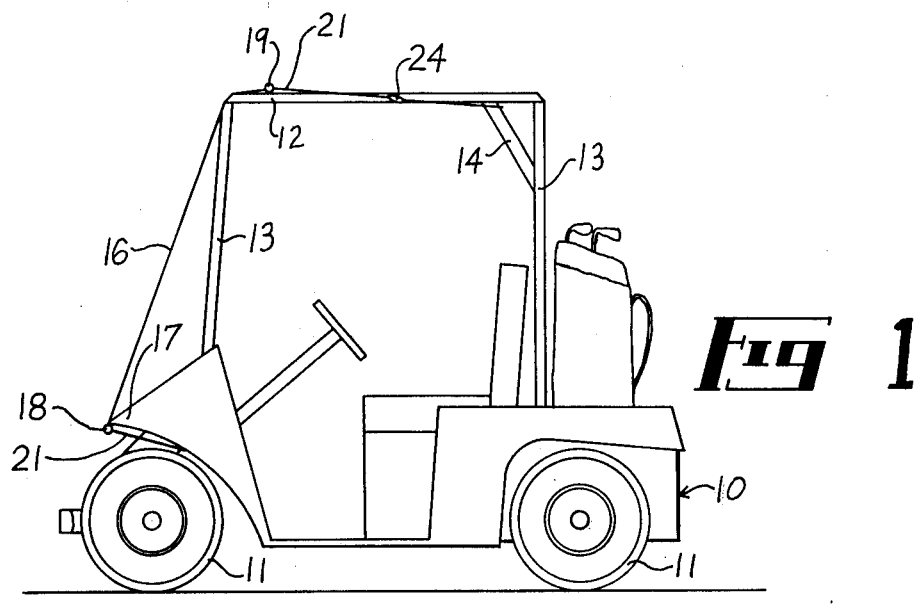
FIG. 1 is a side elevational view showing the windshield mounted on a conventional type golf cart.
Figure 2:
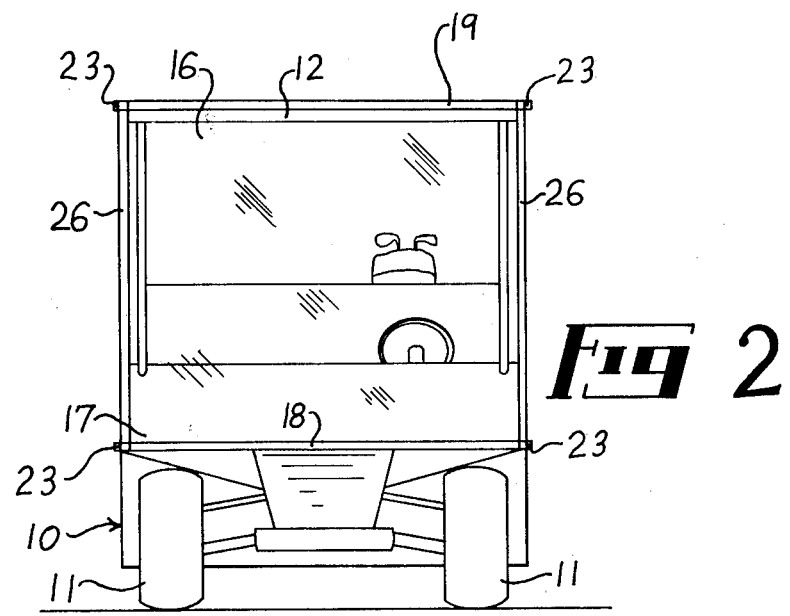
FIG. 2 is a front elevational view thereof.

Referring now to the drawings for a better understanding of my invention, I show a conventional type golf cart 10 which is supported by wheels 11 and is provided with a roof 12 which is supported by suitable upright members 13. Suitable braces 14 may be provided between the upright members 13 and the roof 12, as shown in FIG. 1.

My improved windshield comprises a transparent, flexible sheet 16 which is of a size to extend across the forward end of the cart 10 with the lower edge of the sheet extending to a lower front portion 17 of the cart 10. The upper edge of the sheet 16 extends to the front portion of the roof 12, as shown in FIG. 1.

A rigid, rod-like member 18 is attached to the sheet 16 adjacent the lower edge thereof, as shown in FIG 6 in position to extend transversely of the cart and under the lower front portion 17, as shown. A rigid, rod-like member 19 is attached to the sheet 16 adjacent the upper edge thereof in position to extend transversely of the cart and over the front portion of the roof 12, as shown in FIG. 1. The upper edge of the sheet 16 is attached to the rod-like member 19 in the same manner as the rod-like member 18 is attached to the lower edge of the sheet 16. That is, the lower and upper edges of the sheet 16 are provided with hems of a loop-shape, as viewed in cross section, for receiving the rod-like member 18 or 19, as the case may be.

Figure 3:
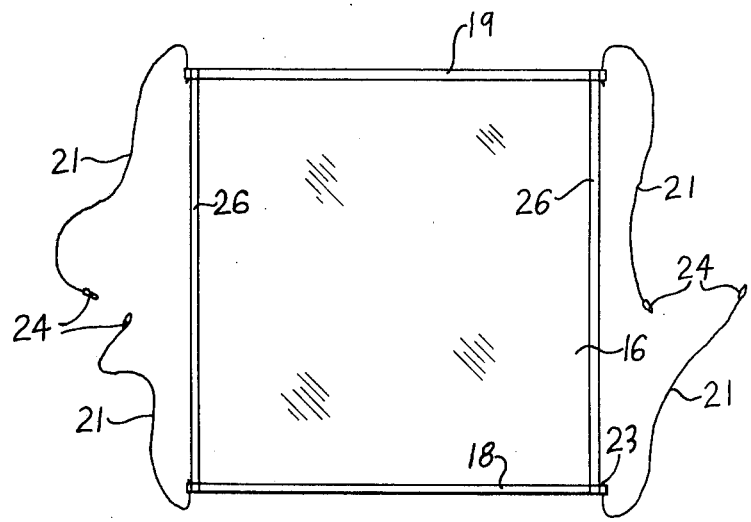
FIG. 3 is a front elevational view showing the windshield removed from the golf cart and showing the windshield in the extended position.
Figure 4:
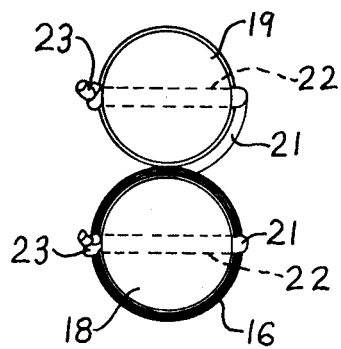
FIG. 4 is an enlarged, end view showing the transparent, flexible sheet wound on one rod-like member with the other rod-like member extending alongside and parallel to the rod-like member on which the flexible sheet is wound whereby the entire unit may be inserted in a golf bag.

As shown in FIG. 3, an elongated flexible member 21 is attached at one end to each end of the rod-like members 18 and 19 with the other end of each flexible member 21 being attached to a suitable structural part of the golf cart, such as the member 14. To attach each of the flexible members 21 to an end of the rod-like members 18 and 19, a through opening 22 is provided adjacent each end of the rod-like members outwardly of the sheet 16 for receiving one end of the flexible member 21. A knot 23 is tied in the adjacent end of the flexible member 21, as shown in FIG. 4, whereby an end of each flexible member 21 is attached to an adjacent end of the rod-like member 18 or 19, as the case may be. The other end of each flexible member 21 carries a grip element 24 which may be in the form of a conventional type grip element having a pair of clamping jaws which are adapted to move toward and away from each other. To secure the free end of the flexible member 21 to the structural part 14, the free end of the flexible member 21 is passed around the member 14 and is then detachably connected by the grip element 24 to another portion of the same flexible member 21, as clearly shown in FIG. 5.

To reinforce the vertical edges of the flexible sheet 16 and at the same time to clearly indicate the position of the outer edges of the flexible sheet 16, I secure colored strips of tape 26 to the sheet 16 adjacent each side edge thereof, as shown in FIG. 3.

When not in use, the windshield is removed from the cart and the sheet 16 is rolled on one rod-like member, such as rod-like member 18, all the way to the other rod-like member 19 so that the rod-like members extend alongside and adjacent each other, as shown in FIG. 4. Accordingly, the entire windshield assembly is reduced to a compact package which may be readily inserted in a golf bag.

From the foregoing description, the operation of my improved windshield for a riding type golf cart will be readily understood. To mount the windshield on a golf cart, the rod-like member 18 is positioned beneath the lower front portion 17 of the golf cart 10 and the flexible members 21 attached thereto are passed around adjacent structural parts of the golf cart 10 and each grip element 24 is then attached to its flexible member. With the rod-like member 18 in position beneath the lower front portion of the cart 10, the upper edge of the sheet 10 is moved upwardly whereby the rod-like member 19 carried thereby extends transversely of the cart and over the front portion of the roof 12, as shown. The flexible members 21 carried by the ends of the rod-like members 19 are then passed around the structural members 14 whereupon each grip element 24 is then clamped to its flexible member, as shown in FIGS. 1 and 5. With the flexible member 16 thus attached to the front of the golf cart 10, the rigid rod-like members 18 and 19 maintain the entire sheet 16 in a common plane whereby there is no distortion of the vision of the golfer.

To remove the windshield from the golf cart 10, the grip elements 24 are released whereupon the flexible members 21 are removed from the structural parts of the golf cart. The flexible member 16 is then rolled on one of the rod-like members, such as rod-like member 18, all the way to the rod-like member 19, as shown in FIG. 4, whereby the rod-like members extend alongside and adjacent each other for portability. The entire unit may then be inserted in a golf bag whereby the windshield unit is always carried by the golfer, thus adapting the windshield for use on carts owned by the golfer and carts which are rented by the golfer.

From the foregoing, it will seen that I have devised an improved portable windshield for riding type golf carts. By providing a windshield which may be easily secured to a golf cart without bolts, screws, clamps or the like, there is no damage to the golf cart and at the same time the windshield may be attached to various type carts employed by the golfer. Also, by providing a windshield which may be detachably connected to the golf cart, the golfer is permitted to play in weather otherwise unfit for play. Furthermore, the windshield protects the golfer from flying golf balls, insects, dust and the like.

While I have shown my invention in but one form, it will be obvious to those skilled in the art that it is not so limited, but is susceptible of various changes and modifications without departing from the spirit thereof.

What I claim is:

1. In a portable windshield for a riding type golf cart having a roof extending thereover and spaced from a lower front portion of the cart,
   a. a transparent, flexible sheet of a size to extend across the forward end of the cart with the lower edge of said sheet extending under said lower front portion of the cart and the upper edge of said sheet extending over the front portion of the roof of the cart,
   b. a first rigid, rod-like member attached to said sheet adjacent said lower edge thereof in position to extend transversely of the cart under said lower front portion of the cart,
   c. a second rigid, rod-like member attached to said sheet adjacent said upper edge thereof in position to extend transversely of the cart and over said front portion of the roof of said cart,
   d. an elongated flexible member attached at one end to each end of said first and second rod-like member beyond the adjacent edge of said sheet with the other end of each said flexible member being attachable to said golf cart, and
   e. said sheet being adapted to be rolled on one rod-like member to the other rod-like member so that said rod-like members extend alongside and adjacent each other for portability.

2. A portable windshield as defined in claim 1 in which said lower edge and upper edge of said sheet is provided with a hem of a loop shape, as viewed in cross section, for receiving said first rod-like member and said second rod-like member respectively.

3. A portable windshield as defined in claim 1 in which a through opening is provided adjacent each end of said first and second rod-like members for receiving said one end of a flexible member.

4. A portable windshield as defined in claim 1 in which a releasable grip element is carried by said other end of each said flexible member so that said other end may be passed around a portion of said golf cart and then detachably connected by said grip element to another portion of the same flexible member.

* * * * *